(12) United States Patent
Chun

(10) Patent No.: US 9,573,271 B2
(45) Date of Patent: Feb. 21, 2017

(54) WEARABLE APPARATUS FOR ASSISTING MUSCLE STRENGTH

(71) Applicant: Hyundai Motor Company, Seoul (KR)

(72) Inventor: Joo Young Chun, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/861,631

(22) Filed: Sep. 22, 2015

(65) Prior Publication Data

US 2016/0325428 A1    Nov. 10, 2016

(30) Foreign Application Priority Data

May 6, 2015    (KR) .......................... 10-2015-0062969

(51) Int. Cl.
| F16M 13/00 | (2006.01) |
| B25J 9/00 | (2006.01) |
| B25J 9/10 | (2006.01) |

(52) U.S. Cl.
CPC ............. B25J 9/0006 (2013.01); B25J 9/1045 (2013.01)

(58) Field of Classification Search
CPC ............ A45F 3/00; A61F 5/02; A61H 1/0274; B25J 9/0006; B25J 9/1045
See application file for complete search history.

(56) References Cited

U.S. PATENT DOCUMENTS

2003/0223844 A1* 12/2003 Schiele ................ A61H 1/0274
                                                                   414/5

FOREIGN PATENT DOCUMENTS

| JP | 2013-052192 A | 3/2013 |
| KR | 2012-0059305 A | 6/2012 |
| KR | 10-1227533 B1 | 1/2013 |
| KR | 10-1241800 B1 | 3/2013 |
| KR | 10-2013-0059712 A | 6/2013 |
| KR | 10-1295966 B1 | 8/2013 |
| KR | 10-1299333 B1 | 8/2013 |
| KR | 10-2015-0019944 A | 2/2015 |

* cited by examiner

*Primary Examiner* — Amy Sterling
(74) *Attorney, Agent, or Firm* — Mintz Levin Cohn Ferris Glovsky and Popeo, P.C.; Peter F. Corless

(57) ABSTRACT

A wearable apparatus for assisting muscle strength includes: a base supported on an upper body of a wearer; a support member coupled to the base and spaced forward at a predetermined distance from the base; and a wire having a first end connected to an arm of the wearer across the support member and supporting the arm of the wearer by lifting the arm in a state of being supported by the support member when a second end of the wire is pulled.

14 Claims, 3 Drawing Sheets

WEARABLE APPARATUS FOR ASSISTING MUSCLE STRENGTH

CROSS-REFERENCE(S) TO RELATED APPLICATION

The present application claims under 35 U.S.C. §119(a) the benefit of Korean Patent Application Number 10-2015-0062969 filed on May 6, 2015, which is incorporated by reference herein in its entirety.

BACKGROUND (a) Technical Field

The present invention relates to a wearable apparatus for assisting muscle strength, and more particularly, to a wearable apparatus for assisting muscle strength that reduces fatigue when used in such a manner that the wearable apparatus is worn by a worker with his or her head up.

(b) Description of the Related Art

Workers who work in a production line or repeat the same work use specific muscles, and these muscles get tired relatively fast, so work efficiency deteriorates.

When a worker becomes excessively tired and loses concentration, it may cause a safety problem, so wearable robots have been developed to reduce fatigue of workers in a workshop.

In general, wearable robots have been developed to more easily carry heavy objects, and in accordance with this trend, robots for reinforcing muscular strength of the lower body and supplementing the action of biceps and flexor muscles of forearm have been developed.

Even with development of these various robots, however, existing robots are inadequate for the action of lifting the wearer's elbows to the height of his or her shoulders while working with the head up. In particular, strain in the shoulders, the neck, and the scapulae of workers may be caused by repetitive tasks performed by workers with their heads up in production sites, and if severe, it may cause inflammation in joints and rheumatoid arthritis.

Further, existing wearable robots have strong frames (links), thus workers wearing the robots may suffer discomfort due to the unnatural motions caused thereby.

Therefore, it is desirable to develop a wearable robot capable of solving these problems.

The foregoing is intended merely to aid in the understanding of the background of the present invention, and is not intended to mean that the present invention falls within the purview of the related art that is already known to those skilled in the art.

SUMMARY

Accordingly, the present invention proposes a wearable apparatus for assisting muscle strength that reduces fatigue of a worker while working with the head up and allows a worker to move naturally.

In order to achieve the above object, according to one aspect of the present invention, there is provided a wearable apparatus for assisting muscle strength that includes: a base supported on an upper body of a wearer; a support member coupled to the base and spaced forward at a predetermined distance from the base; and a wire having a first end connected to an arm of the wearer across the support member and supporting the arm of the wearer by lifting the arm in a state of being supported by the support member when a second end of the wire is pulled.

The base may be formed in the shape of a vest configured to be put on the upper body of the wearer.

The support member may include a first frame protruding forward and a second frame having a first end coupled to the base under the first frame and a second end coupled to the first frame and supporting the first frame.

The portion where the wire is supported by the support member may be positioned above a joint of the first end of the wire and the arm.

The first end of the support member may extend to a wearer's elbow when the support member is in parallel with the arm.

The first end of the wire may be coupled to a portion between a wearer's shoulder and elbow.

The wire may be supported at a front end of the support member, and the first end of the wire may be coupled to an end close to a wearer's elbow between a shoulder and the elbow.

The wire may surround the wearer's arm and may be coupled to the arm to be freely rotatable about the arm.

The apparatus may further include an upper arm case covering a wearer's upper arm and a lower arm case covering a wearer's lower arm, in which the upper arm case and the lower arm case may be elastically combined to maintain a predetermined angle.

The apparatus may further include an outer cover covering a portion between the first end and the second end of the wire, forming a passage for the wire, and having a first end coupled to the support member.

The apparatus may further include a driving unit connected to the second end of the wire and controlled from the outside to roll or unroll the wire.

The apparatus may further include a neck supporter having a first end elastically rotatably coupled to the base and a second end coming in contact with and supporting a neck of the wearer.

The first end of the neck supporter may be coupled to the front side of the base on the wearer and the second end may extend back behind the neck of the wearer, support the back side of the neck, and apply an elastic force forward.

In order to achieve the above object, according to another aspect of the present invention, there is provided a wearable apparatus for assisting muscle strength that includes: a support member supported on an upper body of a wearer and spaced forward at a predetermined distance from a body of the wearer; a wire having a first end connected to an arm of the wearer across the support member and supporting the arm of the wearer by lifting the arm in a state of being supported by the support member when a second end of the wire is pulled; a driving unit connected to the second end of the wire and pulling or extending the wire in response to an external signal; and a neck supporter having a first end elastically rotatably coupled to a base and a second end coming in contact with and supporting a neck of the wearer.

The driving unit may include a driving motor coupled to the second end of the wire for rolling or unrolling the wire, and a controller controlling the driving motor in response to an external operation signal.

According to the wearable apparatus for assisting muscle strength having the structure described above, it is possible to minimize limitations in the wearer's movements while working with the head up, and it is possible to reduce worker fatigue in working with the head up, so work efficiency and productivity can be improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A wearable apparatus for assisting muscle strength according to exemplary embodiments of the present invention is described hereafter with reference to the accompanying drawings.

Figure 1:
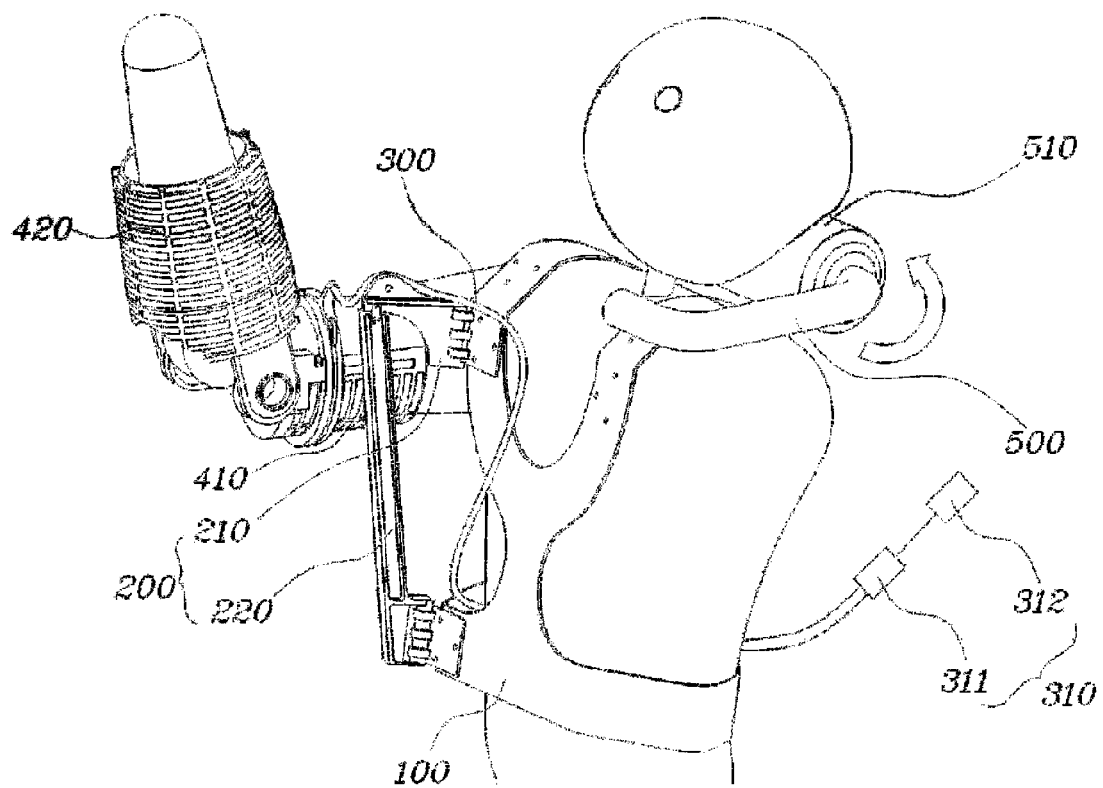
FIG. 1 is a schematic view of a wearable apparatus for assisting muscle strength according to an embodiment of the present invention.
Figure 2:
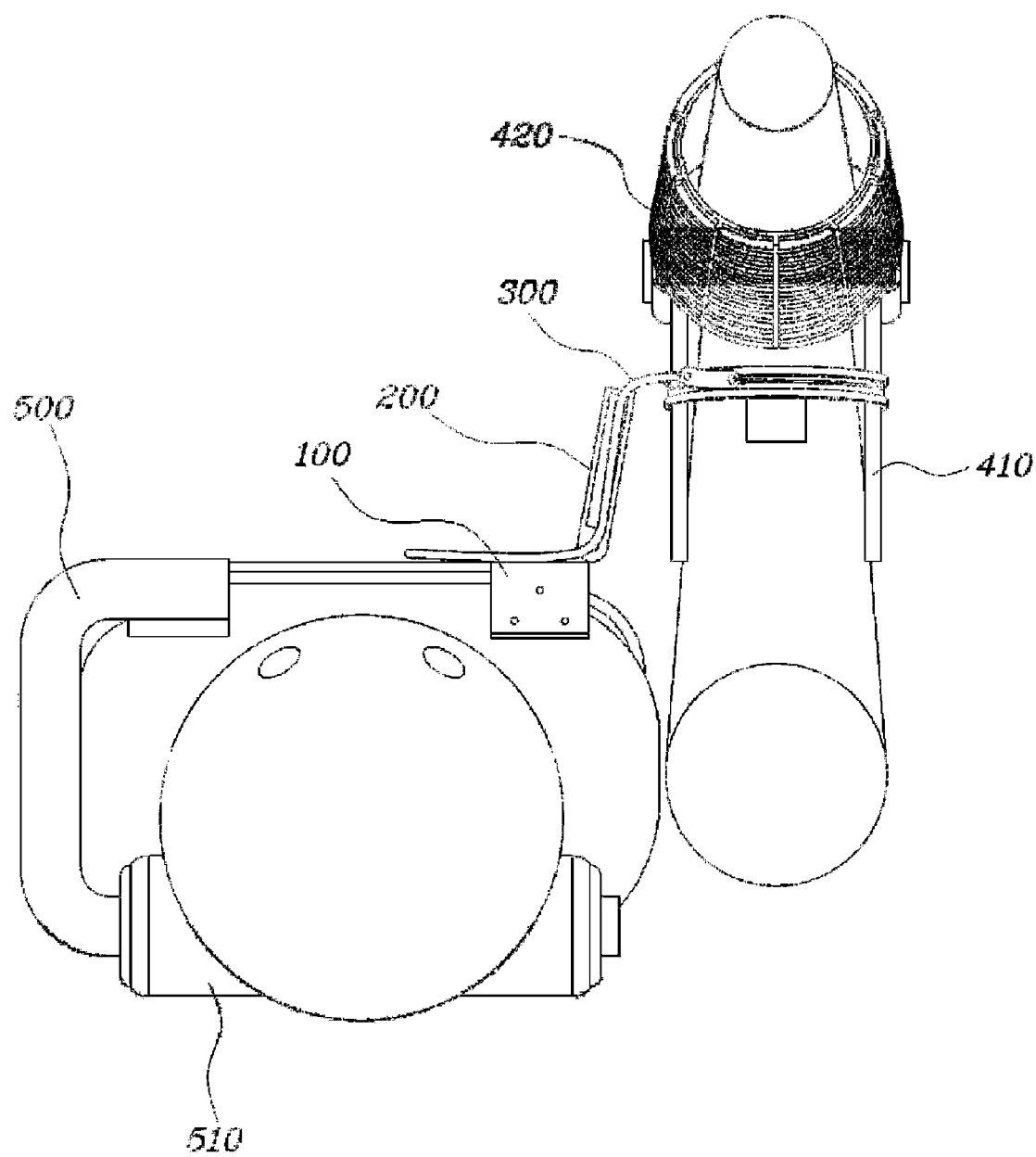
FIG. 2 is a plan view of the wearable apparatus of FIG. 1.
Figure 3:
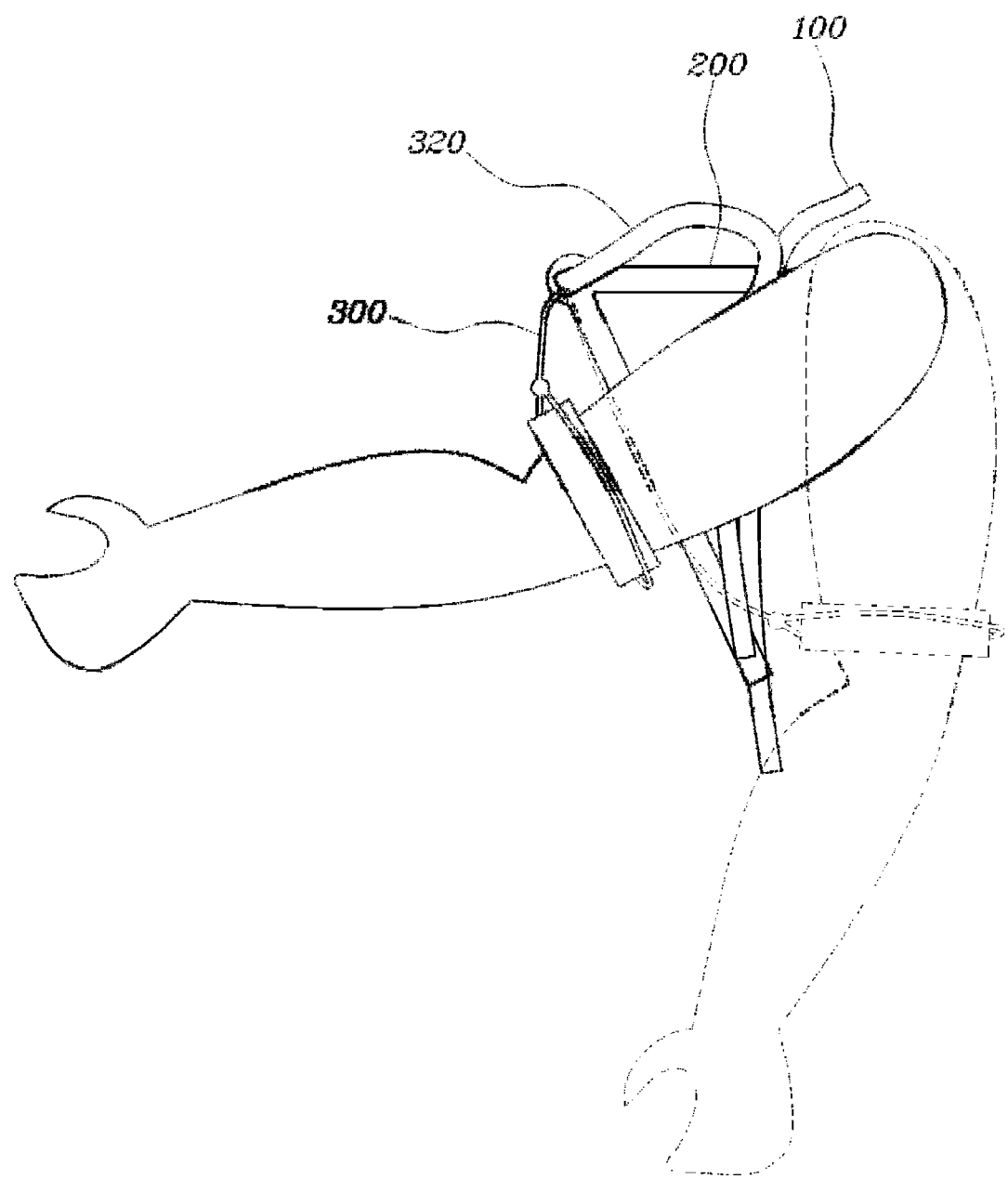
FIG. 3 is a schematic view showing operation of the wearable apparatus of FIG. 1.

FIG. 1 is a schematic view showing the configuration of a wearable apparatus for assisting muscle strength according to an embodiment of the present invention, FIG. 2 is a plan view of the wearable apparatus, and FIG. 3 is a schematic view showing operation of the wearable apparatus.

As shown in FIGS. 1 and 2, a wearable apparatus for assisting muscle strength according to an exemplary embodiment of the present invention includes: a base 100 supported on the upper body of a wearer; a support member 200 coupled to the base 100 and spaced forward at a predetermined distance from the base 100; and a wire 300 having a first end connected to an arm of the wearer across the support member 200 and supporting the arm of the wearer by lifting the arm in a state of being supported by the support member 200 when a second end of the wire 300 is pulled.

In further detail, as shown in FIG. 1, the base 100 may be formed in the shape of a vest configured to be put on the upper body of a wearer, that is, the base 100 may be put on the upper body of the wearer such that it is moved a relatively small amount in order to lift the arm. The base 100 may surround the upper body, covering the upper parts of shoulders and the sides of the wearer, in order to stably support a load when lifting the arm.

Further, the support member 200 may include a first frame 210 protruding forward and supporting the wire 300, and a second frame 220 having a first end coupled to the base 100 under the first frame 210 and a second end coupled to the first frame 210 and supporting the first frame 210.

Alternatively, the second end of the second frame 220 may be coupled to the front end of the first frame 210 protruding forward, and accordingly, the apparatus can have a relatively low weight (i.e., a weight which is easily supported by the wearer) and a simple configuration and can stably support a downward load when lifting the arm.

The support member 200 may be formed in other configurations. For example, the support member 200 may be a block having one side coupled the base 200 and protruding from the base 100, or may be a bracket, or may be formed in various other ways.

The support member 200 may have one end extending to the elbow of the arm when it is in parallel with the arm, and the wire 300 may be supported at the front end of the support member 200. The first end of the wire 300 is coupled to the portion between the shoulder and the elbow of the arm. In particular, the first end of the wire 300 is coupled to the end of the support member 200 closest to the elbow between the shoulder and the elbow.

The portion where the wire 300 is supported by the support member 200 is positioned above the joint of the first end of the wire 300 and the arm, so when the second end of the wire 300 is pulled, the first end of the wire 300 pulls the arm up like a pulley, as shown in FIG. 3, and accordingly, the wearer's arm can be lifted.

Since a first end of the support member 200 extends to the wearer's elbow of the arm and the first end of the wire 300 is coupled to the elbow, even if the arm is lifted maximally in parallel or almost in parallel with the first frame 210, the lower arm can independently move and the upper arm can stably support the lower arm, so the load of the entire arm can be stably supported.

Obviously, the wire 300 does not necessarily support the elbow and it is possible to modify the joint between the arm and the wire 300, the length and shape of the support member 200, and the joint between the support member 200 and the arm.

On the other hand, as shown in FIG. 3, an outer cover 320 that covers the portion between the first end and the second end of the wire 300 forms a passage for the wire 300, and has a first end coupled to the support member 200. The outer cover 320 can form a passage for the wire 300 like a coating, and its first end is coupled to the support member 200 so that the wire 300 is supported by the support member 200. When the second end of the wire 300 is pulled, the displacement can be accurately transmitted to the first end of the wire 300 by the outer cover 300, so it is possible to control accurate lifting.

As another example, the wire 300 may be disposed through the support member 200 or may be held on the support member 200 without the outer cover 320, and the passage for the wire 300 may be formed by disposing the outer cover 320 inside the support member 200.

As shown in FIG. 1, a driving unit 310 is coupled to the second end of the wire for pulling or extending the wire in response to an external signal. The driving unit 310 may include a driving motor 311 that is connected to the second end of the wire 300 and is controlled from the outside to roll or unroll the wire and a controller 312 that controls the driving motor 311. Further, a separate operation switch that is operated by the wearer may be provided so that the controller 312 operates the driving motor 311, and a sensor that detects the rotational angle and torque of the arm by a wearer may be provided so that the driving motor 311 is controlled to provide an assistant force in accordance with rotation of the arm.

An upper arm case 410 covering the upper arm of the arm and a lower arm case 420 covering the lower arm are further provided, and the upper arm case 410 and the lower arm case 420 may be elastically coupled by an elastic member (not shown) to maintain a predetermined angle.

The upper arm case 410 and the lower arm case 420 may fully or partially cover the upper arm and the lower arm, respectively, and may be implemented in various types that can support the arm, such as a frame structure or a panel casing structure. Further, the upper and lower arm cases may be supported by an elastic member to make a predetermined angle suitable for working with the head up. An elastic member such as a torsion spring may be inserted in the joint of the upper arm case 410 and the lower arm case 420 so that a predetermined angle set through a test is basically maintained and can be changed by the wearer, such that the lower arm can be freely moved while working with the head up.

The first end of the wire 300 may be disposed around the arm, that is, may be extended around the upper case 410 and coupled to the arm, and may be coupled to be free in rotation about the arm. Since the wire 300 surrounds the arm, the wire 300 can uniformly resist the load of the arm and the portion of the wire 300, which is close to the arm, can be changed in angle when the arm is lifted. In particular, as shown in FIG. 2, since there is a predetermined gap between the support member 200 and the arm, when the arm is lifted, the angle between the pulling direction of the wire 300 and the load direction on the arm changes. Accordingly, when the wire 300 is fixed to the arm, the change is applied as torsion to the arm and the torsion is applied to the wearer. When the wire 300 is fixed to the upper arm case 410, the torsion is applied to the upper arm case 410, that is, applied to the entire arm of the wearer, so it may cause discomfort or inconvenience in performing work-related tasks. Accordingly, the wire 300 is coupled to be free in rotation about the arm or the upper arm case 410, so this structure prevents torsion and a stable work environment can be achieved.

Alternatively, without the wire 300 directly surrounding the arm or the upper arm case 410, a bracket that can freely rotate may be mounted on the arm or the upper arm case 410 and then the bracket and the wire 300 may be connected, in which the bracket may be a portion of the wire 300.

A neck supporter 500 having a first end elastically rotatably coupled to the base and a second end coming in contact with and supporting the neck of a wearer may be further provided. The first end of the neck supporter 500 may be coupled to the front side of the base 100 on a wearer and the second end may extend back behind the neck of the wearer, support the back side of the neck, and apply an elastic force forward.

An elastic member for applying an elastic force forward from the neck support 500, for example, a torsion spring may be disposed at the joint of the base 100 and the neck support 500, and the direction in which the neck and the head are tilted back and the direction in which the second end of the neck supporter 500 rotates about the first end correspond or almost correspond to each other, so the neck and the head can be smoothly supported by the elastic member.

A cushion 510 is disposed at the second end of the neck supporter 500, so the head and the neck can be comfortably supported.

According to the wearable apparatus for assisting muscle strength having the structure described above, the upper body of a wearer is not supported by a link assembly, but partially supported by a wire, so it is possible to minimize a limit in movement in working with the head up.

Further, it is possible to reduce fatigue of the upper arm, the shoulder, or the scapula, when a worker repeatedly and continuously performs work with the head up, so efficiency of working and productivity can be improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A wearable apparatus for assisting muscle strength, comprising:
   a base supported on an upper body of a wearer;
   a support member coupled to the base and spaced forward at a predetermined distance from the base;
   a wire having a first end connected to an arm of the wearer across the support member and supporting the arm of the wearer by lifting the arm in a state of being supported by the support member when a second end of the wire is pulled; and
   a neck supporter having a first end elastically rotatably coupled to the base and a second end coming in contact with and supporting a neck of the wearer.

2. The apparatus of claim 1, wherein the base is formed in the shape of a vest configured to be put on the upper body of the wearer.

3. The apparatus of claim 1, wherein the support member includes a first frame protruding forward and a second frame having a first end coupled to the base under the first frame and a second end coupled to the first frame and supporting the first frame.

4. The apparatus of claim 1, wherein a portion where the wire is supported by the support member is positioned above a joint of the first end of the wire and the arm.

5. The apparatus of claim 1, wherein the first end of the support member extends to a wearer's elbow when the support member is in parallel with the arm.

6. The apparatus of claim 1, wherein the first end of the wire is coupled to a portion between a wearer's shoulder and elbow.

7. The apparatus of claim 1, wherein the wire is supported at a front end of the support member, and the first end of the wire is coupled to an end close to a wearer's elbow between a shoulder and the elbow.

8. The apparatus of claim 1, wherein the wire surrounds the wearer's arm and is coupled to the arm to be freely rotatable about the arm.

9. The apparatus of claim 1, further comprising an upper arm case covering a wearer's upper arm and a lower arm case covering a wearer's lower arm,
   wherein the upper arm case and the lower arm case are elastically combined to maintain a predetermined angle.

10. The apparatus of claim 1, further comprising an outer cover covering a portion between the first end and the second end of the wire, forming a passage for the wire, and having a first end coupled to the support member.

11. The apparatus of claim 1, further comprising a driving unit connected to the second end of the wire and controlled from the outside to roll or unroll the wire.

12. The apparatus of claim 1, wherein the first end of the neck supporter is coupled to the front side of the base on the wearer and the second end extends back behind the neck of the wearer, supports the back side of the neck, and applies an elastic force forward.

13. A wearable apparatus for assisting muscle strength, comprising:
   a support member supported on an upper body of a wearer and spaced forward at a predetermined distance from a body of the wearer;
   a wire having a first end connected to an arm of the wearer across the support member and supporting the arm of the wearer by lifting the arm in a state of being supported by the support member when a second end of the wire is pulled;
   a driving unit connected to the second end of the wire and pulling or extending the wire in response to an external signal; and
   a neck supporter having a first end elastically rotatably coupled to a base and a second end coming in contact with and supporting a neck of the wearer.

14. The apparatus of claim 13, wherein the driving unit includes a driving motor coupled to the second end of the wire for rolling or unrolling the wire, and a controller controlling the driving motor in response to an external operation signal.

* * * * *